(12) United States Patent
Richardson

(10) Patent No.: US 6,403,540 B1
(45) Date of Patent: Jun. 11, 2002

(54) CHEMICAL COMPOSITION FOR CLEANING AN AUTOMOTIVE AIR CONDITIONING SYSTEM AND METHOD FOR OPERATING AND CLEANING

(75) Inventor: Robert C. Richardson, Yorba Linda, CA (US)

(73) Assignee: Wynn Oil Company, Azusa, CA (US)

( * ) Notice: Subject to any disclaimer, the term of this patent is extended or adjusted under 35 U.S.C. 154(b) by 0 days.

(21) Appl. No.: 09/579,850

(22) Filed: May 25, 2000

(51) Int. Cl.[7] .................. C10M 129/74; C10M 141/10
(52) U.S. Cl. ................ 508/440; 508/485; 508/486; 508/489; 508/590; 252/68; 62/114; 62/502; 510/273
(58) Field of Search ............... 508/440, 485, 508/486, 489, 590; 252/68; 62/114, 502; 510/273

(56) References Cited

U.S. PATENT DOCUMENTS

| | | | |
|---|---|---|---|
| 5,626,790 A | * | 5/1997 | Minor |
| 5,966,949 A | * | 10/1999 | Futagami et al. |
| 6,103,684 A | * | 8/2000 | Thenappan et al. |
| 6,251,300 B1 | * | 6/2001 | Takigawa et al. |

\* cited by examiner

Primary Examiner—Jerry D. Johnson
(74) Attorney, Agent, or Firm—Terry L. Miller

(57) ABSTRACT

A composition for cleaning and lubricating automotive air conditioners contains a polyol ester lubricant, an antiwear and extreme pressure additive, and a solvent mixture of tetrafluoroethane and 2,3-dihydroperfluoropentane. An automotive air conditioning system and a method of its cleaning and operation with the cleaning and lubricating composition present in the system are presented.

22 Claims, 4 Drawing Sheets

Figure 1:
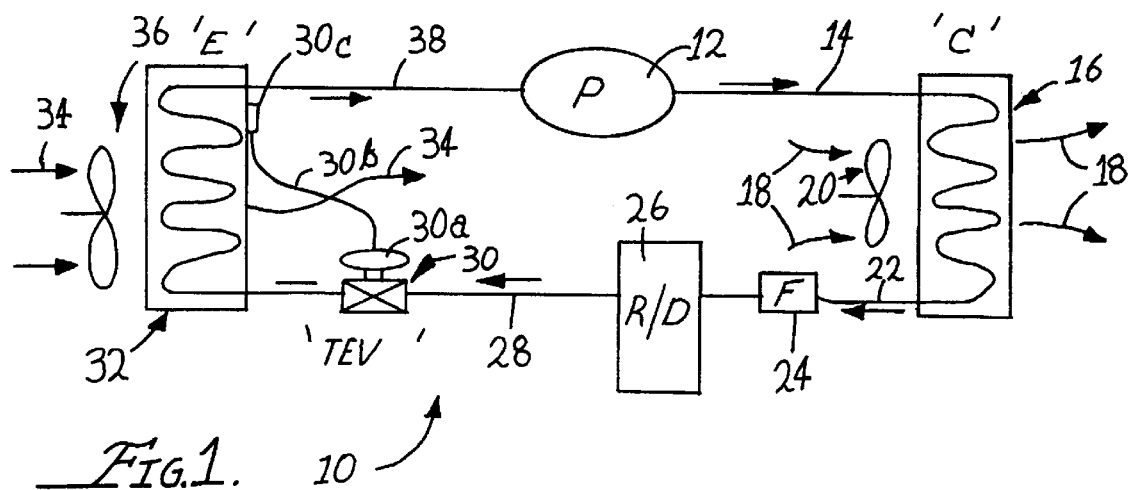

CHEMICAL COMPOSITION FOR CLEANING AN AUTOMOTIVE AIR CONDITIONING SYSTEM AND METHOD FOR OPERATING AND CLEANING

BACKGROUND OF THE INVENTION

1. Field of the Invention

The present invention relates to compositions which are useful for cleaning and lubricating air conditioning systems. In one of its more particular aspects, this invention relates to such compositions which are particularly useful in cleaning and lubricating automotive air conditioners. Still more particularly, the chemical composition taught by this invention is useful in servicing an automotive air conditioning system as part of a change over of the system from F-12 to a newer none ozone-depleting refrigerant, such as F-134.

2. Related Technology

Concern that chlorofluorocarbons may cause stratospheric ozone depletion has mandated the replacement of chlorofluorocarbons (i.e., such as refrigerant F-12) by refrigerants which are not ozone depleters. For this reason, chlorofluorocarbon refrigerants have largely been replaced in newer automobiles by refrigerants which are hydrofluorocarbons (i.e., such as F-134). This change in refrigerants for automotive use has resulted in the need for compositions, for example, cleaners and lubricants for air conditioning systems, which are compatible with hydrofluorocarbons. This is especially the case when an older automotive air conditioning system that was designed to use F-12, is changed over to the newer F-134 refrigerant. Mineral-based lubricants, that were previously used in F-12 air conditioning systems, while compatible with chlorofluorocarbons, have been found to be incompatible with hydrofluorocarbons, such as F-134. Therefore, lubricants other than the typical mineral-based lubricants must now be provided for use in refrigeration systems employing hydrofluorocarbons.

When an older automotive air conditioning system is serviced at the present time, F-12 cannot be placed back into the system because it is prohibited by Federal law to do so. The system must be converted to use the newer F-134 type of refrigerants. In this situation, it is common for several major components of the system to be changed. For example, the condenser coil (i.e., heat exchanger) may be replaced with a larger one that is better suited to the user of R-134. Further, the evaporator coil and thermal expansion valve, or liquid refrigerant metering orifice, for example) may also be replaced for the same reason. The receiver/drier of the system is almost always replaced with a new one any time an automotive air conditioning system is opened up for service. Finally, the compressor of the air conditioning system may or may not be replaced with a newer and larger compressor. Usually, the refrigerant lines of the system are not replaced if they are in good condition.

In the above-described context of service and replacement of components of an older automotive air conditioning system, the choice of lubricant used in the system in fact may be critical to successful operation of the air conditioning. Particularly, if the old compressor is retained, the mineral lubricating oil must be drained from the compressor, and new oil which is compatible with the new refrigerant and the old compressor must be supplied into the system.

Such lubricating compositions which are used in automotive air conditioning systems must not only clean and lubricate moving parts, but must also cycle repeatedly through an automotive air conditioning system, without breaking down under conditions of high temperatures and pressures. The lubricants must also be capable of flowing through the system at low temperatures.

It is further required that a cleaning and lubricating composition which can be used as part of the service procedure as outlined above to convert an older automotive air conditioning system to R-134 type of refrigerant, or which may be used in the service of a system designed originally to use the R-134 type of refrigerants, must provide cleaning, antioxidant, and anti-wear properties, and must also withstand extreme pressures. It is essential that the composition not only be compatible with the refrigerant, but that it also provide excellent protection from wear and corrosion of ferrous, aluminum, and bronze parts of the air conditioning system. It must not deteriorate seals, closures, and flexible hoses of the system.

To the present time, no such cleaning and lubricant composition has been available for use in the automotive market. Consequently, it is common practice for automotive air conditioning systems that are being serviced to have components that are returned to service even though they may harbor remnants of the old mineral oil lubricant, as well as possibly debris from a damaged compressor, for example. Alternatively, it is common for many components of an automotive air conditioning system to be replaced when they may be in serviceable condition except for concerns about not being able to clean these components adequately.

SUMMARY OF THE INVENTION

It is accordingly an object of the present invention to provide compositions for cleaning and lubricating automotive air conditioning systems.

It is another object of the present invention to provide such compositions which are compatible with hydrofluorocarbon refrigerants.

Accordingly, the present invention, according to one aspect, provides an automotive air conditioner system cleaning and lubricating composition comprising: a mixture of tetrafluoroethane, 2,3-dihydroperfluoropentane, tricresyl phosphate, and a polyol ester.

Further, and in general, it has been found that compositions for cleaning and lubricating automotive air conditioning systems which do not deplete ozone can be formulated using a mixture of hydrofluorocarbons. The mixture of hydrofluorocarbons is combined with polyol ester lubricants and extreme-pressure additives. A typical formulation consists of a mixture of tetrafluoroethane (Freon R-134a), 2,3-dihydroperfluoropentane, a polyol ester, and tricresyl phosphate.

In this mixture the polyol ester lubricant and tricresyl phosphate extreme-pressure additive together comprise about 1% to 10% by weight of the overall mixture, whereas the tetrafluoroethane makes up from about 60% to about 70% of the composition, and the 2,3-dihydroperfluoropentane comprises about 30% by weight of the overall mixture.

In the solvent mixture of tetrafluoroethane and 2,3-dihydroperfluoropentane, which makes up about 90% of the mixture, the tetrafluoroethane comprises about $2/3^{rd}$ to about $7/10^{th}$ of the solvents, and the 2,3-dihydroperfluoropentane comprises about $1/3^{rd}$ to about $3/10^{th}$ of the solvent mixture.

The cleaning and lubricating compositions of the present invention are effective in removing traces of chlorofluorocarbons, as well as oils, which may be present in automotive air conditioning systems because of the previous use of chlorofluorocarbons and mineral oil lubricants. The compositions of the present invention are effective in both cleaning and lubricating automotive air conditioner systems. They are compatible with Freon R-12, Freon R134a, other hydrofluorocarbons, mineral oils, alkyl benzenes, and polyalkylene glycols. The lubricant constituent provides excellent wear protection and anti-corrosion for various metal parts, including aluminum, iron, and bronze parts. They provide very good low temperature fluidity as well as high temperature film strength, which assures internal lubrication at both low and high ambient conditions. In addition, they are compatible with seal and hose materials and are unaffected by residual chlorine and other contaminants that may be in the automotive air conditioning system.

Other objects and advantages of the present invention will become apparent from the following detailed disclosure and description.

BRIEF DESCRIPTION OF THE DRAWING FIGURE

Figure 2:
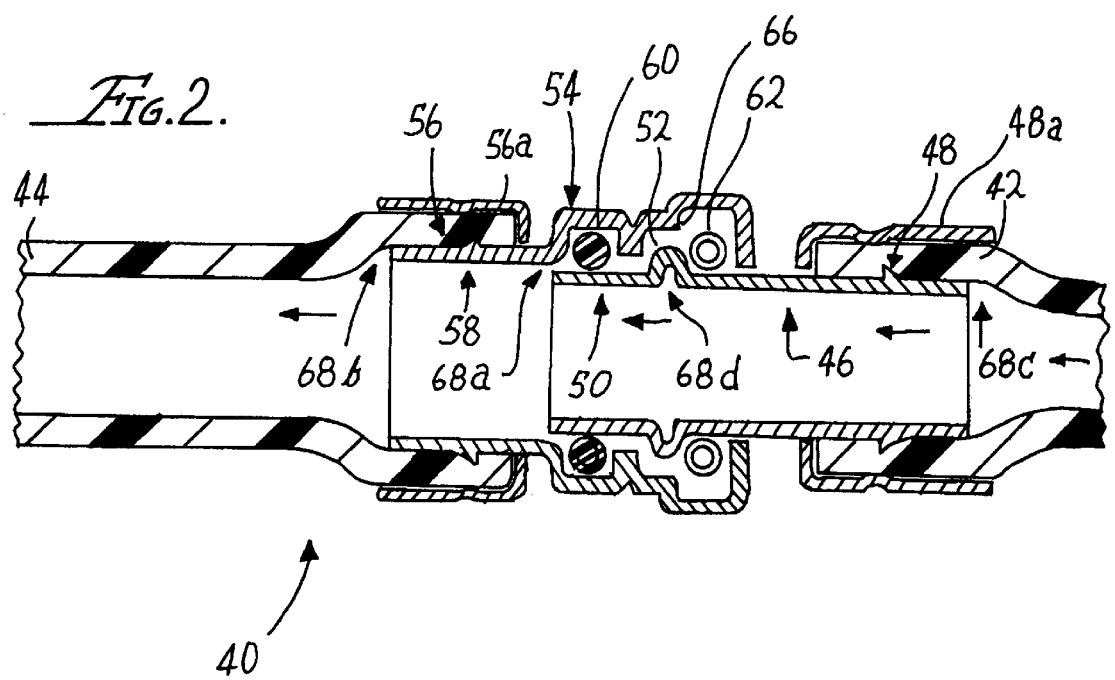
Figure 3:
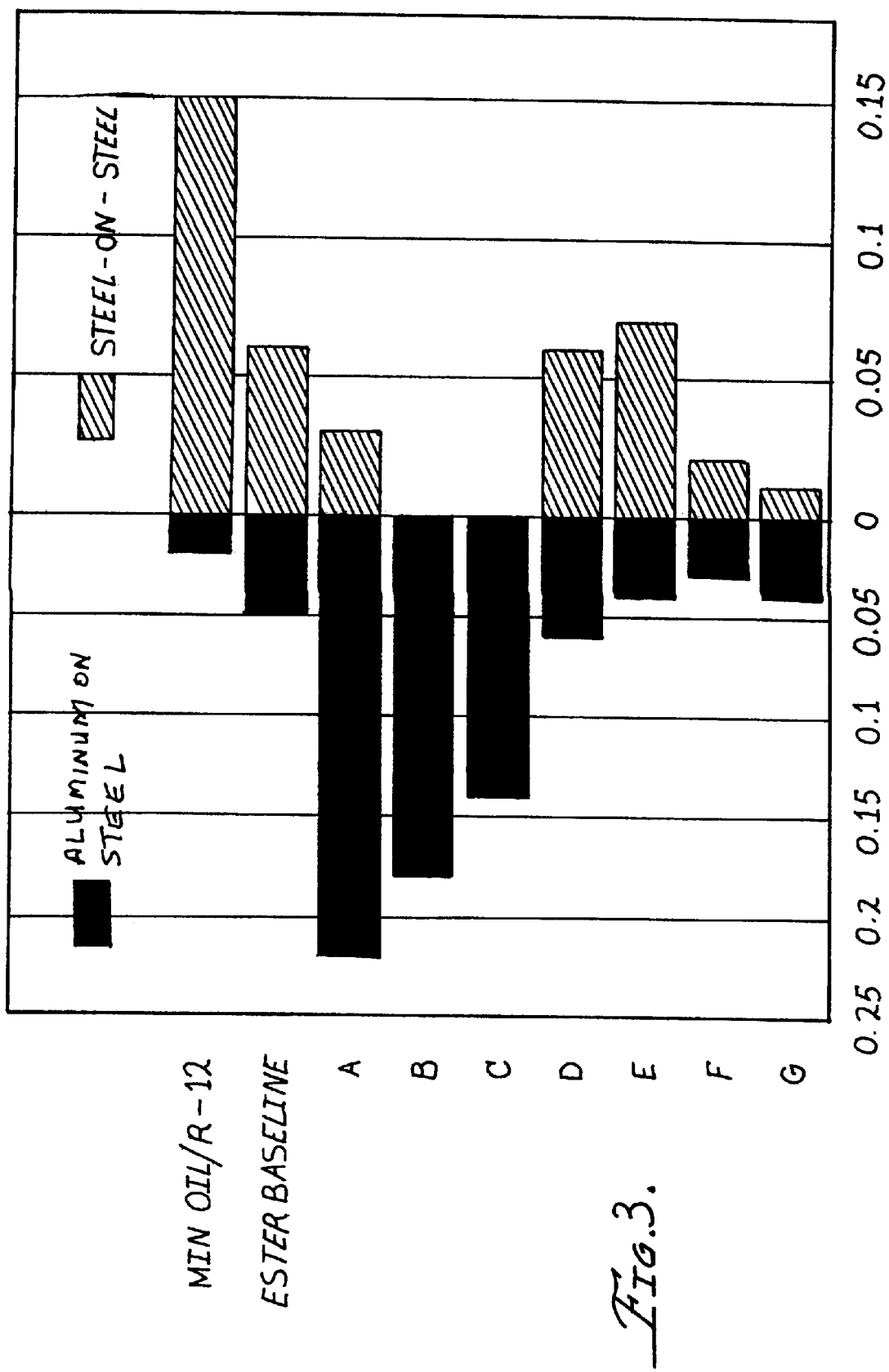
Figure 4:
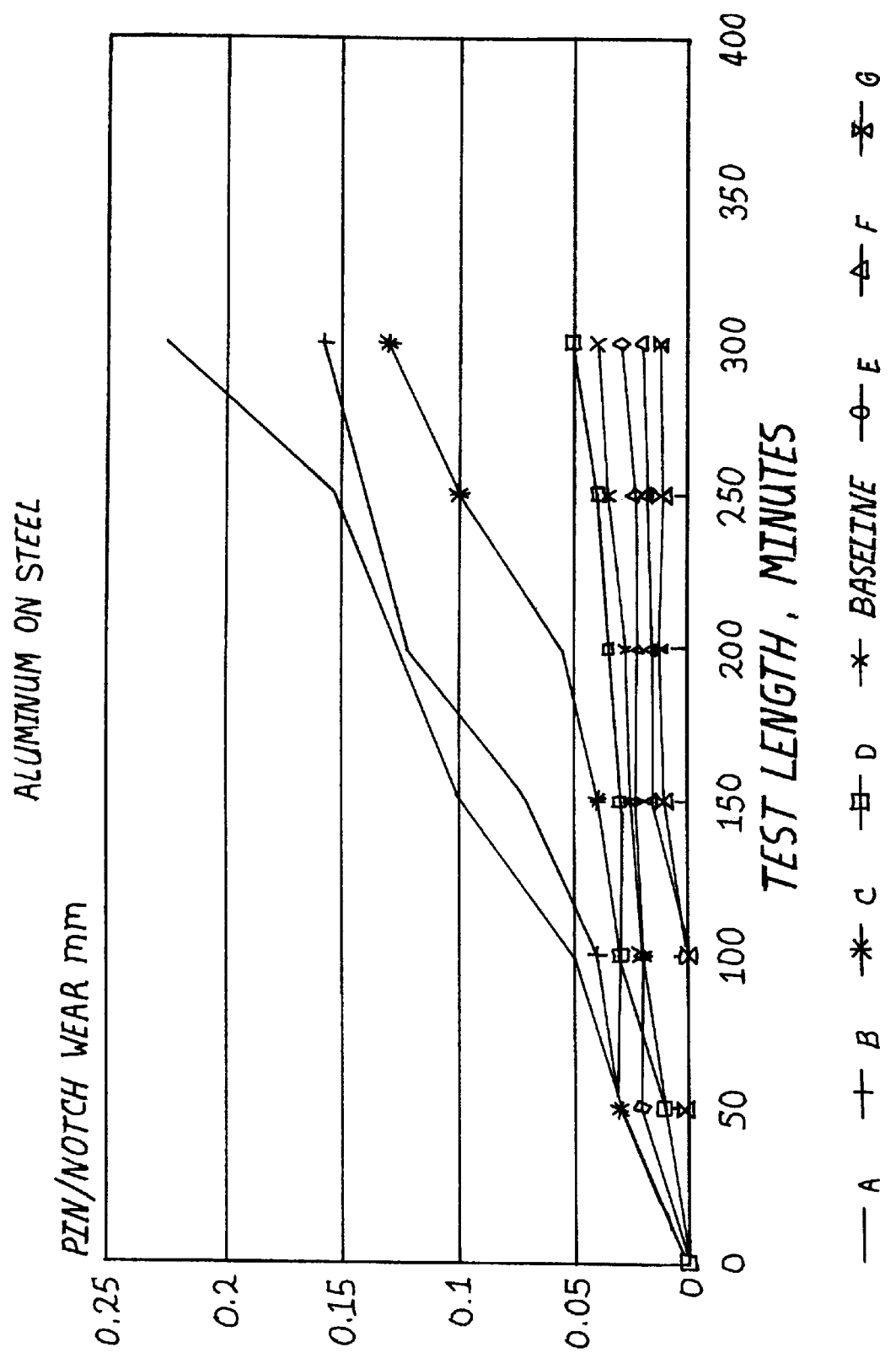
Figure 5:
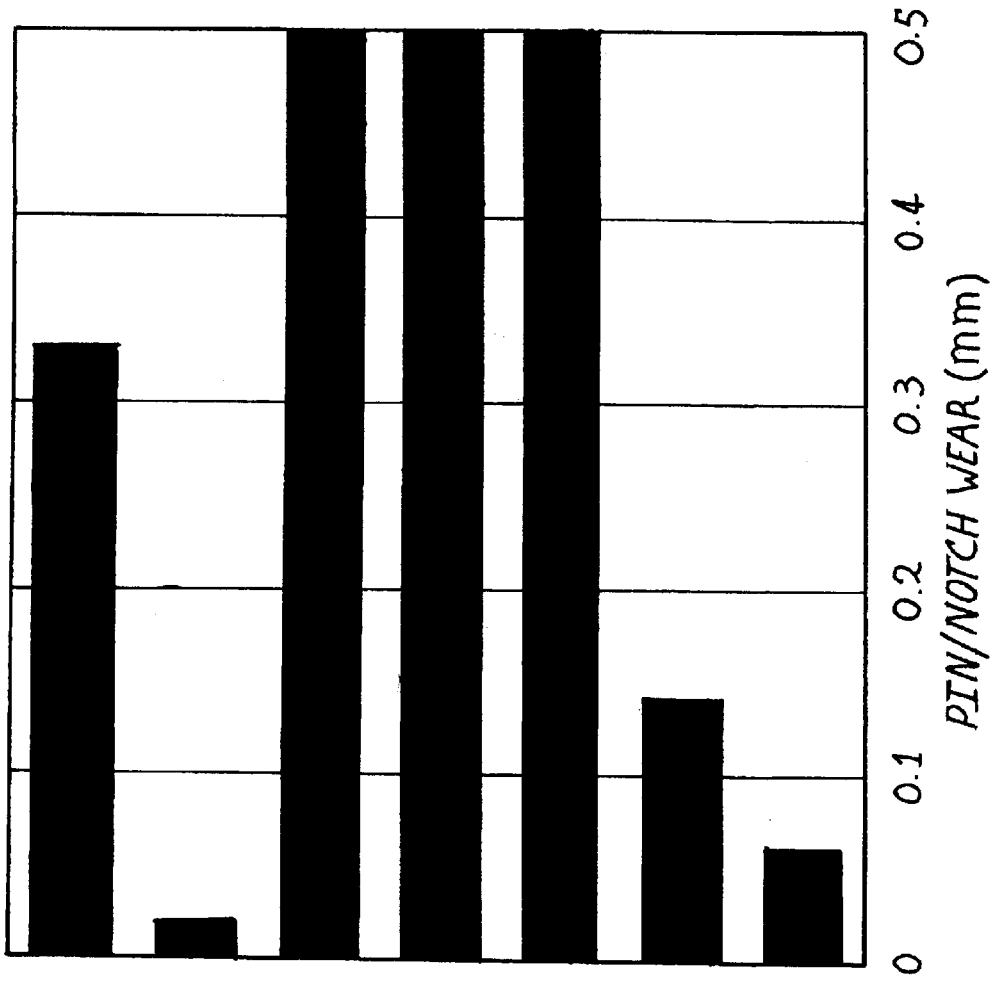

FIG. 1 provides a diagrammatic illustration of a typical automotive air conditioning system;

FIG. 2 is a fragmentary cross sectional view through a typical hose connector assembly of the air conditioning system seen in FIG. 1, and illustrates locations where debris may collect in the system; and FIGS. 3, 4, and 5 are graphical presentations of the results of testing of the present invention.

DESCRIPTION OF AN EXEMPLARY PREFERRED EMBODIMENT OF THE INVENTION

Viewing FIG. 1, a typical automotive air conditioning system 10 is illustrated. The system 10 includes a compressor (i.e., a fluid pump) 12 which is ordinarily driven by the vehicle engine via an electromagnetic clutch and a drive belt (neither of which are seen in the drawing Figures). The compressor 12 receives refrigerant vapor (as will be explained) at a comparatively low pressure, and supplies this vapor pressurized to a higher level via a conduit 14 to a condenser coil 16. In essence, the condenser coil 16 is a heat exchanger, liberating heat from the air conditioning system 10 to ambient. For this reason, the coil 16 is ordinarily exposed to an ambient air flow (indicated by arrows 18) the flow of which through the coil 16 may be assisted not only by a fan 20 but also by movement of the automotive vehicle containing the system 10.

In the coil 16, refrigerant vapor changes phase to become a liquid, and gives up heat at a comparatively high temperature. This heat is liberated by the coil 16. The liquid refrigerant cooled in the coil 16 exits this coil along a conduit 22 and may flow through a filter 24 (optional and not included in all automotive air conditioning systems) on its way to a receiver/drier 26. The receiver/drier 26 serves both as an accumulator for liquid refrigerant, and as a container for holding a desiccant bed through which the liquid refrigerant flows. The desiccant insures that no water is free to circulate along with the refrigerant in the air conditioning system 10.

From the receiver/drier 26 refrigerant flows in a conduit 28 under the control of a thermal expansion valve 30 having an actuator 30 connected by a capillary tube 30b to a temperature sensor 30c. Refrigerant flowed through the thermal expansion valve 30 flows immediately into an evaporator coil (i.e., heat exchanger) 32 in which the refrigerant is at a much lower pressure. Consequently, in the evaporator coil 32, the refrigerant undergoes another change of phase, becoming a vapor again, and absorbing heat at a comparatively low temperature. The cool refrigerant in the coil 32 allows this coil to cool air (arrows 34) propelled through the coil by a fan 36. The air 34 cooled in the coil 32 is directed into the interior of an automotive vehicle to provide air conditioning for the occupants of this vehicle. Refrigerant vapor from the coil 32 is communicated in a conduit 38 (to which the temperature sensor bulb 30c is attached immediately adjacent to the coil 32) to the suction side of the compressor 12.

In view of the above, it is apparent that during normal operation of the system 10, wear particles from the compressor 12 can enter conduit 14, condenser coil 16, conduit 22, and filter 24. In a system which does not include the optional filter 24, such wear particles can also enter the receiver drier 26. Thus, in the event that a catastrophic failure of the compressor 12 occurs, particles created by the failure of the compressor can enter all of the system components that are subject to receiving wear particles. Lubricant from the compressor 12 flows around the system along with the refrigerant. So all of the components of the system 10 will contain compressor lubricant.

FIG. 3 illustrates a typical conduit connection 40 that may be employed at a variety of locations in the system 10. For example, this type of conduit connection may be employed to connect conduit 14 to condenser coil 16. The particular connection 40 shown in FIG. 2 is one that is configured to connect two lengths of refrigerant hose 42 and 44 to one another. However, this is not necessarily the case, and such connections as this connection 40 may be configured to connect another component to a hose or to a rigid tube, for example. Viewing the conduit connection 40, it is seen that this connection includes a male coupling portion 46 attached to hose 42 by a hose barb feature 48, and including an axially extending nose portion 50 and a radially outwardly extending flange portion 52. The hose 42 is retained on hose barb feature 48 by a metallic crimped sleeve 48a. The male coupling portion is received into and is sealingly and captively retained by a female coupling portion 54. This female coupling portion 54 includes a hose barb feature 56, upon which the hose 44 is retained by a metallic crimped sleeve 56a.

The female coupling portion 54 defines a stepped bore 58 receiving the male coupling portion 46, as is seen in FIG. 2. Also, the bore 58 receives an O-ring type of sealing member 60 sealingly extending between the coupling portions 46 and 54, and an expansible "garter spring" retainer 62. The "garter spring" retainer 64 is captive in a chamber 66 of the female coupling portion 54, and engages the flange 52 to captively retain the male coupling portion 46 engaged into the female coupling portion 54. However, those ordinarily skilled in the pertinent arts will recognize that an expansion tool (not shown) may be inserted under the retainer 64 to expand this retainer and allow the male coupling portion to be withdrawn from within the female coupling portion 54.

Importantly, viewing FIG. 2, it is seen that the coupling 40 provides both an area where a sealing member (i.e., sealing ring 60) is exposed to fluid flow in the refrigerant system, and also provides a location where were particles and failure particles can accumulate. That is, the coupling 40 exposes the seal ring 60 to possible deterioration because of exposure to lubricants or cleaners used in the system, and also provides an annular chamber at 68a, as well as annular recesses at 68b, 68c, and 68d, where wear and failure particles can reside. The present cleaning and lubricating composition is able to remove wear and failure particles from these locations, as well as doing no deterioration to the seal 60, by being flushed through the fitting 40 and hoses 42, 44, as is indicated by the arrows on FIG. 2. Moreover, the present invention provides a cleaning composition with a combination of solvents that will vigorously remove both wear particles and failure particles from locations (such as locations 68) in an automotive air conditioning system 10. Further, the lubricating and cleaning composition according to the present invention will not cause deterioration of seals, such as ring seal 60.

Many fluorinated hydrocarbons can be used as solvents in the present invention. However, a mixture of tetrafluoroethane (R-134a) and 2,3-dihydroperfluoropentane is especially preferred. The tetrafluoroethane should comprise about $2/3^{rd}$ to $7/10^{th}$ of the solvents. Preferably, $1/3^{rd}$ to $3/10^{th}$ of the solvent mixture is 2,3-dihydroperfluoropentane.

A typical composition according to the present invention has the following solvent ingredients:

| | |
|---|---|
| Tetrafluoroethane (R-134a) | 60–70% Wt. |
| 2,3-Dihydroperfluoropentane | 30% Wt. |

The physical properties of this cleaning and lubricating product are shown in Table 1.

TABLE 1

PHYSICAL PROPERTIES

| | |
|---|---|
| Kinematic Viscosity | |
| 40° C., cST | 210 |
| 100° C., cST | 18.5 |
| Pour Point, ° C. | −30 |
| Specific Gravity | |
| 15.6° C./15.6° C. | 0.9724 |
| Flash PT. ° C. | 255 |
| Color | 0.5 |
| Water content, ppm | <50 |
| Acid Number, Base Ester | .01 |
| Total Acid Number | 0.14 |
| Hydroxyl Number | <5 |
| Critical Solution Temp. HFC-134a, ° C. | |
| Upper | >90 |
| Lower | −15 |
| Copper Strip | |
| 100° C. | 1/b |
| 121° C. | 1/b |
| Phosphorous Content, % Wt. | 0.4 |

Polyol ester lubricants display improved stability in the presence of refrigerants at high temperatures, and improved viscosity/temperature characteristics resulting in improved hydrodynamic lubrication of compressor bearings in the compressor 12. In addition, polyol esters possess a much higher viscosity index (VI) compared with naphthenic based oils (i.e., the conventional lubricating oils used in R-12 automotive air conditioning systems). Even though this would naturally impart a higher film strength for the polyol ester, the antiwear properties of the lubricant would still be deficient without the incorporation of an antiwear agent. This is because the new hydrofluorocarbon, Freon R-134a, does not possess the intrinsic antiwear properties of the chlorofluorocarbon, Freon R-12 (i.e., coming from the chlorine component). In order to improve the properties of the lubricant, therefore, an antiwear and extreme pressure agent is used (i.e., tricresyl phosphate). Preferably, this tricresyl phosphate is present in an amount sufficient to provide from about 0.004% to about 0.067% by mass of phosphorous.

The most convenient method of lubricant application is by means of a solution which is injected into an air conditioning system by means of an aerosol, since such composition can be used to both lubricate and clean the various parts of the air conditioning system. This is particularly true of automotive air conditioners where the tubing through which the solution must pass is generally of minimal cross-sectional diameter. Thus, an aerosol injected cleaning and lubricating composition finds particular application in automotive air conditioners.

The cleaning and lubricating compositions of the present invention generally consists of a polyol ester lubricant, an antiwear and extreme pressure additive, and a solvent. Four polyols are generally employed in making polyol esters. These are neopentylglycol, glycerol, trimethylolpropane, and pentaerythritol. With respect to R-134a compatibility and air conditioning system performance, a wide variety of polyol ester lubricants can be prepared from these four polyols and the many carboxylic acids available. Further, a wide variety of carboxylic acids can be used to prepare the polyol esters used in the present invention. Also, many extreme pressure and antiwear additives can be used in the cleaning and lubricating compositions of this invention. These include chlorinated hydrocarbons, sulfur/phosphorous additives, zinc dialkyldithiophosphate and various other phosphates. However, tricresyl phosphate is preferred.

EXAMPLE 1

A Falex Pin-on "V" Block apparatus similar to that described in ASTM D-322 was operated. This method consists of running a rotating steel journal at 290±10 rpm against two stationary V blocks immersed in the lubricant sample. Load is applied to the V-blocks by a ratchet mechanism. Load is applied in 250-lb increments with load maintained constant for one minute at each load increment. The load-fail value is the criteria for level of load-carrying properties.

To more accurately simulate a compressor environment, HFC-134a refrigerant gas was bubbled into the lubricant. The effect of the HFC-134a not only displaced the oxygen but also mixed in the lubricant, thus lowering the overall viscosity. Operating particulars are as follows:

SAE 3135 steel pin rotating against "V" blocks of:
(1) AISI 1137 steel
(2) SAE 390 die-cast aluminum
(3) SAE 660 bronze
Block loading—250 lb
Test duration—5 hours Samples were pre-saturated with refrigerant gas and then transferred to the Falex apparatus. Introduction of gas was continued throughout the test. During the test, a ratchet device was used to maintain constant loading, with wear rate information determined by the number of notches advanced on the ratchet. A final wear reading, reported as "pin/notch wear," represents the distance in millimeters advanced by the ratchet device after the 5-hour test period. On completion of the test, wear scars on the "V" blocks were measured and weight loss of steel pins determined. The loading sustained by the lubricant was calculated by measuring the area of the wear scar on the "V" block.

The screening test performance for a polyol ester with two different concentrations of tricresyl phosphate on aluminumon-steel is summarized in FIG. 3. These date clearly show a decisive advantage versus the baseline, which is the polyol ester without any additive and the CFC-12/mineral oil system. FIG. 4 indicated the same results for steel-on-steel, and FIG. 5 for bronze-on-steel. Aluminum-on-steel performance is superior to that of the ester baseline and is, in fact, very similar to that of the conventional CFC-12/mineral oil combination. The steel-on-steel results show a dramatic increase in antiwear response. The bronze-on-steel test ran to completion while supporting less load compared to the ester baseline. Results however were superior to the conventional CFC-12/mineral oil combination. Thus, compressor 12 may be expected to give at least as good a service after the system 10 is serviced according to this invention as it would have if it were operated using the convention CFC-12/mineral oil combination.

The formulation containing the higher concentration of tricresyl phosphate exhibited excellent performance under all three contact regimens. As seen in FIGS. 3, 4, and 5, the steel-on-steel, aluminum-on-steel, and bronze-on-steel all have very low wear scar. It is interesting note that at the higher concentration of the antiwear agent (tricresyl phosphate) the bronze-on-steel wear is only slightly higher then the baseline.

Automotive compressor lubrication follows three commonly known methods: hydrodynamic, elastohydrodynamic, and boundary lubrication. While a compressor generally operates under hydrodynamic or elastohydrodynamic lubrication, boundary lubrication is occasionally seen under conditions such as during start-up and under high pressure conditions. For this reason antiwear additives are required to protect metal surfaces. Lubricants must be compatible with materials in closed or hermetic systems. These materials may include the insulation material for the motor windings, as well as elastomers and plastics. Although typical compressors used in automobiles are the reciprocating, rotary, scroll, screw, and centrifugal types (with reciprocating piston compressors, of crank-operated or of swash plate operated design being by for the most predominant), the reciprocating type is the most widely used, as well as the most discriminating to antiwear properties of lubricants. Therefore, a variable displacement reciprocating compressor was chosen for the following example.

EXAMPLE 2

Before testing, compressors were flushed with two charges of test lubricant. On completion of the run, the units were disassembled and parts examined visually for wear. Also, an inspection was conducted for overall cleanliness, deposit formation and/or copper plating.

The compressor was operated according to the following parameters:

| | |
|---|---|
| Compressor Speed | 600 rpm |
| Head Pressure | 435 psi (30 bar) |
| Relative Humidity | 40% |
| Evaporator Temperature | 40° C. |
| Test Duration | 200 hours |

Approximate conditions resulting from the above parameters are as follows:

| | |
|---|---|
| Suction Pressure | 90 psi (6.2 bar) |
| Suction Temperature | 28° C. |
| Discharge Temperature | 82° C. |
| Evaporator Air Temperature | 27° C. |

Baseline ester: The pollyol ester without tricresyl phosphate endured the 200 hour test period with some wear on steel and bronze and with little wear on aluminum. Generally, aluminum-on-steel wear is not a problem in these evaluations. However, excessive steel-on-steel wear was observed in a critical bearing area. As previously shown, steel-on-steel wear was the major base-fluid shortcoming identified by Falex evaluations.

The formulation having the lower concentration of tricresyl phosphate passed the 200 hour test and was noticeably superior to the baseline, despite some bronze attack. Control of steel-on-steel wear was significantly improved. The good response in the Falex Test shown in Example 1 relates to superior compressor performance.

The formulation containing the higher concentration of tricresyl phosphate was also significantly superior to the baseline and the CFC-12/mineral oil reference, and offered an additional benefit of improved system cleanliness. The excellent steel-on-steel wear performance was retained, with only mild bronze wear distributed among a few contact areas. Again, the good response in the Falex Test, also relates to superior compressor performance.

Further to the above, a cleaner and lubricant according to the present invention can be packaged in a barrier-pack container. This barrier pack consists of an inner and an outer package. The inner package contains 1 oz. of product and the outer package contains 4 grams of propellant (propane/isobutane). Two adapters are supplied with the container for the injection of the lubricant, one for the R-134a and one for the R-12 systems, since the structure of the automotive air conditioner valves are different for the two systems. The product is applied in approximately two minutes. Moreover, the product can be used during a service of an automotive air conditioning system 10 with components of the system opened (i.e., disconnected) in order to flush out wear particles and failure particles. Further, the cleaning and lubricating product can be introduced into a closed air conditioning system, in order to improve the performance and useful life span of the system.

While a particular embodiment of the present invention has been disclosed, it is to be understood that various different modifications are possible and are contemplated within the true spirit and scope of the appended claims. There is no intention, therefore, of limitation of the present invention to the exact abstract or disclosure herein presented.

What is claimed is:

1. An automotive air conditioner cleaning and lubricating composition which comprises:
   a mixture of tetrafluoroethane, 2,3-dihydroperfluoropentane, and a polyol ester.

2. The automotive air conditioner cleaning and lubricating composition of claim 1, further including tricresyl phosphate.

3. The automotive air conditioner cleaning and lubricating composition of claim 2, wherein said tricresyl phosphate is present in an amount sufficient to provide from about 0.004% to about 0.067% by mass of phosphorous.

4. An automotive air conditioner cleaning and lubricant composition comprising about 60% to 70% of a mixture of tetrafluoroethane and 2,3-dihydroperfluoropentane, and about 1%–10% of a mixture of a polyol ester lubricant and an extreme pressure additive.

5. The composition of claim 4, wherein said tetrafluoroethane comprises about $\frac{2}{3}^{rd}$ to about $\frac{7}{10}^{th}$ of said mixture of tetrafluoroethane and 2,3-dihydroperfluoropentane.

6. The composition of claim 4, wherein said polyol ester lubricant is a reaction product of neopentylglycol and a carboxylic acid.

7. The composition of claim 4, wherein said polyol ester lubricant is a reaction product of glycerol and a carboxylic acid.

8. The composition of claim 4, wherein said polyol ester lubricant is a reaction product of trimethylolpropane and a carboxylic acid.

9. The composition of claim 4, wherein said polyol ester lubricant is a reaction product of pentaerythritol and a carboxylic acid.

10. The composition of claim 4, wherein said extreme pressure additive is tricresyl phosphate.

11. The automotive air conditioner cleaning and lubricating composition of claim 10, wherein said tricresyl phosphate is present in an amount sufficient to provide from about 0.004% to about 0.067% by mass of phosphorous.

12. A method of operating an automotive air conditioning system, said method comprising steps of:
    utilizing a compressor to pressurize refrigerant vapor;
    providing a condenser coil receiving the pressurized refrigerant vapor, and utilizing the condenser coil to provide liquefied refrigerant liquid while liberating heat to the ambient;
    providing an evaporator coil receiving the liquefied refrigerant and providing
    refrigerant vapor to said compressor while absorbing heat from a conditioned space; and
    supplying into said compressor, said condenser coil, and said evaporator coil a cleaning and lubricating composition including a mixture of tetrafluoroethane, 2,3-dihydroperfluoropentane, and a polyol ester.

13. The method of claim 12 further including the steps of including in said lubricating and cleaning composition about 1% to about 10% of a mixture of a polyol ester lubricant and an extreme pressure additive.

14. The method of claim 13 including the step of selecting as said extreme pressure additive tricresyl phosphate.

15. The method of claim 14, further including the steps of providing said tricresyl phosphate at a mass percentage that provides from about 0.004% to about 0.067% of phosphorous.

16. The method of claim 12 further including the steps of providing said cleaning and lubricating composition with about $\frac{2}{3}^{rd}$ to about $\frac{7}{10}^{th}$ by weight of tetrafluoroethane, and with about 30% by weight of 2,3-dihydroperfluoropentane.

17. A method of internally cleaning and lubricating an automotive air conditioning system having a compressor, a condenser coil, and an evaporator coil interconnected with one another in a refrigerant recirculation loop, said method comprising the step of: introducing into said refrigerant recirculation loop a cleaning and lubricating composition including a mixture of tetrafluoroethane, 2,3-dihydroperfluoropentane, and a polyol ester.

18. The method of claim 17 further including the steps of opening said refrigerant recirculation loop to ambient, and flowing said cleaning and lubricating composition through a portion of said refrigerant recirculation loop and to ambient in order to remove debris therefrom.

19. The method of claim 17 further including the steps of including in said cleaning and lubricating composition about 1% to about 10% of a mixture of a polyol ester lubricant and an extreme pressure additive.

20. The method of claim 19 including the step of selecting as said extreme pressure additive tricresyl phosphate.

21. The method of claim 20, including the step of making said tricresyl phosphate present in an amount sufficient to provide from about 0.004% to about 0.067% by mass of phosphorous.

22. The method of claim 17 further including the steps of providing said cleaning and lubricating composition with about $\frac{2}{3}^{rd}$ to about $\frac{7}{10}^{th}$ by weight of tetrafluoroethane, and with about 30% by weight of 2,3-dihydroperfluoropentane.

* * * * *